United States Patent [19]
Fletcher

[11] Patent Number: 4,463,420
[45] Date of Patent: Jul. 31, 1984

[54] MULTIPROCESSOR CACHE REPLACEMENT UNDER TASK CONTROL

[75] Inventor: Robert P. Fletcher, Poughkeepsie, N.Y.

[73] Assignee: International Business Machines Corporation, Armonk, N.Y.

[21] Appl. No.: 351,396

[22] Filed: Feb. 23, 1982

[51] Int. Cl.³ .................. G06F 9/30; G06F 15/16; G06F 13/00
[52] U.S. Cl. .................................................. 364/200
[58] Field of Search ............................. 364/200, 900

[56] References Cited

U.S. PATENT DOCUMENTS

| | | | |
|---|---|---|---|
| 3,771,137 | 11/1973 | Barner et al. | 364/200 |
| 3,845,474 | 10/1974 | Lange et al. | 364/200 |
| 3,848,234 | 11/1974 | MacDonald | 364/200 |
| 4,228,503 | 10/1980 | Waite et al. | 364/200 |
| 4,317,168 | 2/1982 | Messina et al. | 364/200 |
| 4,322,795 | 3/1982 | Lange et al. | 364/200 |
| 4,394,731 | 7/1983 | Flusche et al. | 364/200 |
| 4,399,506 | 8/1983 | Evans et al. | 364/200 |

Primary Examiner—Charles E. Atkinson
Assistant Examiner—William G. Niessen
Attorney, Agent, or Firm—Bernard M. Goldman

[57] ABSTRACT

The disclosure describes a novel cache directory entry replacement method and means for central processors (CPs) in a multiprocessor (MP) based on task identifiers (TIDs) provided in each directory entry to identify the program task which inserted the respective entry. A remote TID register is provided to receive the TID from any remote CP in the MP on each cache miss cross-interrogation hit from any remote CP. Each time a respective CP (i.e. local CP) makes a storage request to its private cache directory, a congruence class in the directory is selected and the TIDs in the selected class are compared to any remote TID in the CP's remote TID register. A TID candidate is any entry in the class which compares equal to the remote TID and is not equal to the current local processor TID. It is identified as a candidate for replacement in the local cache directory on a cache miss. The candidate priorities for replacement in the selected class are: highest priority is any invalid entry, next is any TID condidate, and lowest priority is the conventional LRU candidate. The TID operation obtains early castout to main storage of any cache line associated with a task being executed in a remote CP and not associated with the task being executed in the CP casting out the line, so that the remote CP can fetch more quickly a line which it will probably need in the task it is currently executing and will not be needed by the CP casting it out. This reduces the potential for future cross-interrogation hits.

9 Claims, 11 Drawing Figures

MULTIPROCESSOR CACHE REPLACEMENT UNDER TASK CONTROL

INTRODUCTION

This invention relates to cache directory entry replacement selection in multiprocessor (MP) systems in which each central processor (CP) has a private store-in-cache, and system main storage (MS) is shared by the CPs.

BACKGROUND ART

Most high performance CPs (i.e. CPUs) have a private high speed hardware managed buffer memory (i.e. cache) for receiving fetched lines from MS to improve the average MS access time for each CP. The cache is usually transparent to a program executing on any CP in the system.

In MP configurations using private store-in-caches (SICs), there is the problem of each CP obtaining the most recently updated version of a MS line, because each CP can change a line in its private cache without correspondingly changing the version of the same line in MS. CPs with private store-through (ST) caches do not have this problem because each update of a line in a ST cache is always correspondingly done in MS. The disadvantage of a ST cache is that all stores (which usually average between ten and twenty percent of all CP requests), are always sent to MS and therefore require substantial MS bandwidth to avoid significant performance degradation. Consequently, the MP level (i.e. the number of CPs sharing MS) is generally very limited by the ST cache, unless a relatively costly high bandwidth MS is used.

The SIC is used in systems where there is insufficient MS bandwidth to make "storing through" a viable solution. SIC caches are described in U.S Pat. Nos. 3,735,360 and 3,771,137 and in application Ser. No. 205,500 entitled "Improved Cache Line Shareability Control For A Multiprocessor" by F. 0. Flusche et al, which are all assigned to the assignee of the present application.

Thus, a ST cache handles stores differently from fetches, that is, a store miss cannot occur because all store requests go to MS, independently of whether the addressed line (target line) is in the cache. Conversely, a SIC cache treats stores and fetches the same; and the line must be in the cache before performing a store or fetch. If the target line is not in the cache (i.e. cache miss), the line is transferred from MS to the cache before performing the fetch or store. Because all subsequent stores to a line take place in the cache (and therefore do not go to MS), the SIC cache substantially reduces the MS bandwidth needed, compared to a ST cache design.

A problem with a SIC cache in a multiprocessing system is that the most current data is often in the caches and not in MS. Consequently, to insure that each CP fetches the most current MS data whenever a CP generates a fetch or store request to its private cache and the target line is not in the cache (i.e. line miss), all CP cache directories must be cross-interrogated to determine if the missed line is present in any other cache (i.e. a remote cache); and, if so, whether the remote copy of the line has been changed (i.e. stored into). If the line is not in a remote cache, the line is fetched from MS to the requesting CPs cache. If the line is found in a remote cache but is not changed, the line is fetched from MS to the requesting CP cache, and the line is invalidated in the remote cache by setting its valid flag to zero. If the line is found in a remote cache and also is changed, the updated line must first be cast-out of the remote cache to MS before invalidating it in the remote cache. After the line is transferred to MS, the requesting CP fetches the line to its cache and then performs the CP store or fetch request.

Copies of the same line which are not changed may be found in multiple CP caches in the MP and be concurrently fetched from, as long as none is stored into.

This movement of a changed line (that takes place on a cross-interrogate hit) entails substantial overhead because the remote CP must send the line to MS or directly to the requesting CPs cache. Thus, the plural CPs encounter inferference and lost time. Even worse, many times the remote CP wants the updated line back shortly after giving it up, and the line ping-pongs between CPs.

SUMMARY OF THE INVENTION

The present invention provides a novel cache replacement method which applies to both ST and SIC caches, but the invention will improve the performance of SIC caches more significantly because of the higher cross-interrogation overhead experienced on SIC caches. Consequently, the invention's replacement method is described for SIC caches in the preferred detailed embodiment in this specification.

During the remainder of this specification, the requesting CP (which encounters the cache line miss and cross interrogates (XI) the other CP(s)), is referred to as a "remote CP", and the other CP (in which a XI hit occurs) is referred to as the "local CP" which must invalidate its copy of the line and cast it out if changed.

This invention uses a program task identifier (i.e. TID) which designates a dispatchable (i.e. executable) unit of a program job. It is not meant to imply that the program visible task ID must be used in the implementation of this invention. In fact, it is common in large commercial IBM CPs for a segment table origin (STO) to be assigned by the hardware to represent a task ID, which also may be associated at any given time with a storage protect key, and other attributes depending on the architecture and software/hardware implementation. In current IBM large CPs, the hardware represented STO is assigned to each page frame address represented in a CPs translation lookaside buffer (TLB) which is related to each cache entry using the translated address represented in the TLB.

This invention is based on an observation that a XI hit (i.e. conflict) of a line in a local CP cache is a dynamic indication that other data lines in the local cache associated with the same TID will likely be requested in the near future by the remote CP causing the last XI hit. This invention selectively enables the subsequent cast-out of those lines in the local cache which are associated with the same TID as a local line recently receiving an XI hit. If this same task is not currently executing on the local CP, it is not likely that the lines associated with this task will be requested by the local CP in the near future. However, it is possible that lines of a task currently executing on the local CP may be required by the local CP in the near future, and this invention excludes such lines from early replacement.

By replacing entries having a different TID rather than a valid LRU entry with the current TID, the local CP's performance is improved by having more line in cache accessible to the currently executing task.

The invention provides a task identifier (TID) tag with each cache directory line entry to identify the task which requested the line. The tag, for example, is derived from the segment table origin (STO) and the storage protect key for that task. When a cross-interrogate (XI) hit causes a castout, the TID tag of the line which is castout is remembered in a remote TID register (RTR). Subsequently, when a line needs to be replaced in the cache, lines having the same TID tag found in the RTR are candidates for replacement on the assumption that they are associated with a task now running on another CP and therefore may soon be required by that task, as long as they are not associated with the task now running on the local CP.

The form of the TID is dependent on the system architecture of the CPs using the invention. Thus, the IBM System 38 has a unique 2 byte "process ID" to uniquely identify each task (process), which is available to the hardware and can provide the TID in this specification. With CPs using the IBM System/370 architecture, a task identifier can be obtained by using the STO (segment table origin) and the storage protect key associated with the current program status word (PSW). Although this System/370 task identifier is not always a unique TID because multiple tasks can sometimes run under the same STO and storage protect (SP) key, the consequence of this is that there will be times when the STO and SP key in the remote and local CPs is the same, in which case this invention will not set any task ID into the RTR of either CP. In these cases the performance benefit of this invention may be correspondingly reduced, but there are no negative consequences.

The invention use of the TID significantly reduces the cross-interrogation overhead in the MP, while at the same time improving the cache hit ratio. The TID control by this invention is especially effective for large SIC caches where changed lines are still aging in the cache when different tasks are dispatched among plural CPs in an MP, causing line castouts on local replacements due to local cache misses before the requesting task in the remote CP requires the castout lines, which are therefore available from MS to a future remote CP request with faster access than they would be available from another cache.

DESCRIPTION OF THE EMBODIMENT

Figure 11:
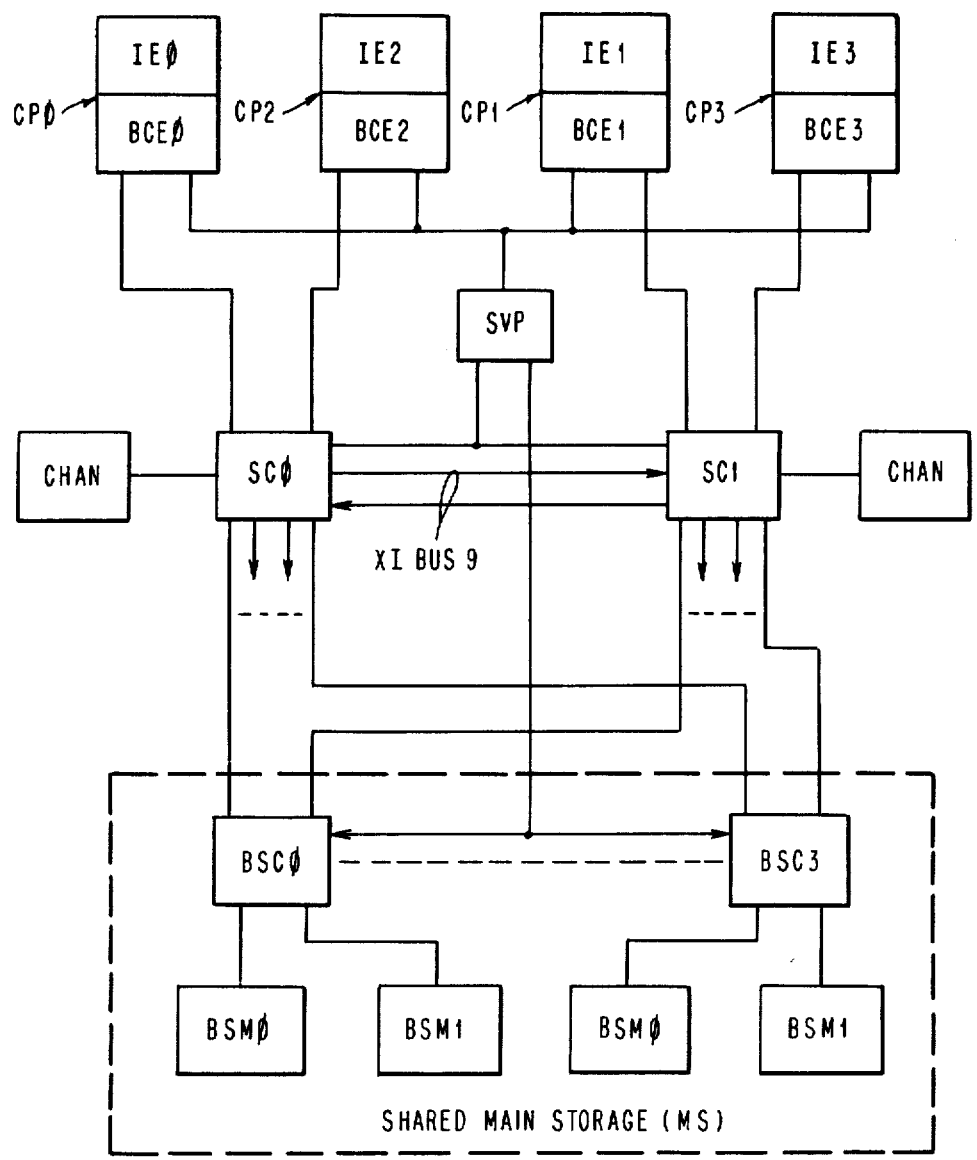
FIG. 11 is a diagram of a multiprocessor which may contain the invention.

The preferred embodiment is provided in each central processor (CP) in the multiprocessor (MP) shown in FIG. 11. Cache misses are communicated among the CPs by the cross-interrogation (XI) bus 9 shown in FIG. 11 in the manner described in U.S. patent application Ser. No. 205,500 Filed Nov. 10, 1980 by F. 0. Flusche et al and assigned to the same assignee as this application.

Figure 1:
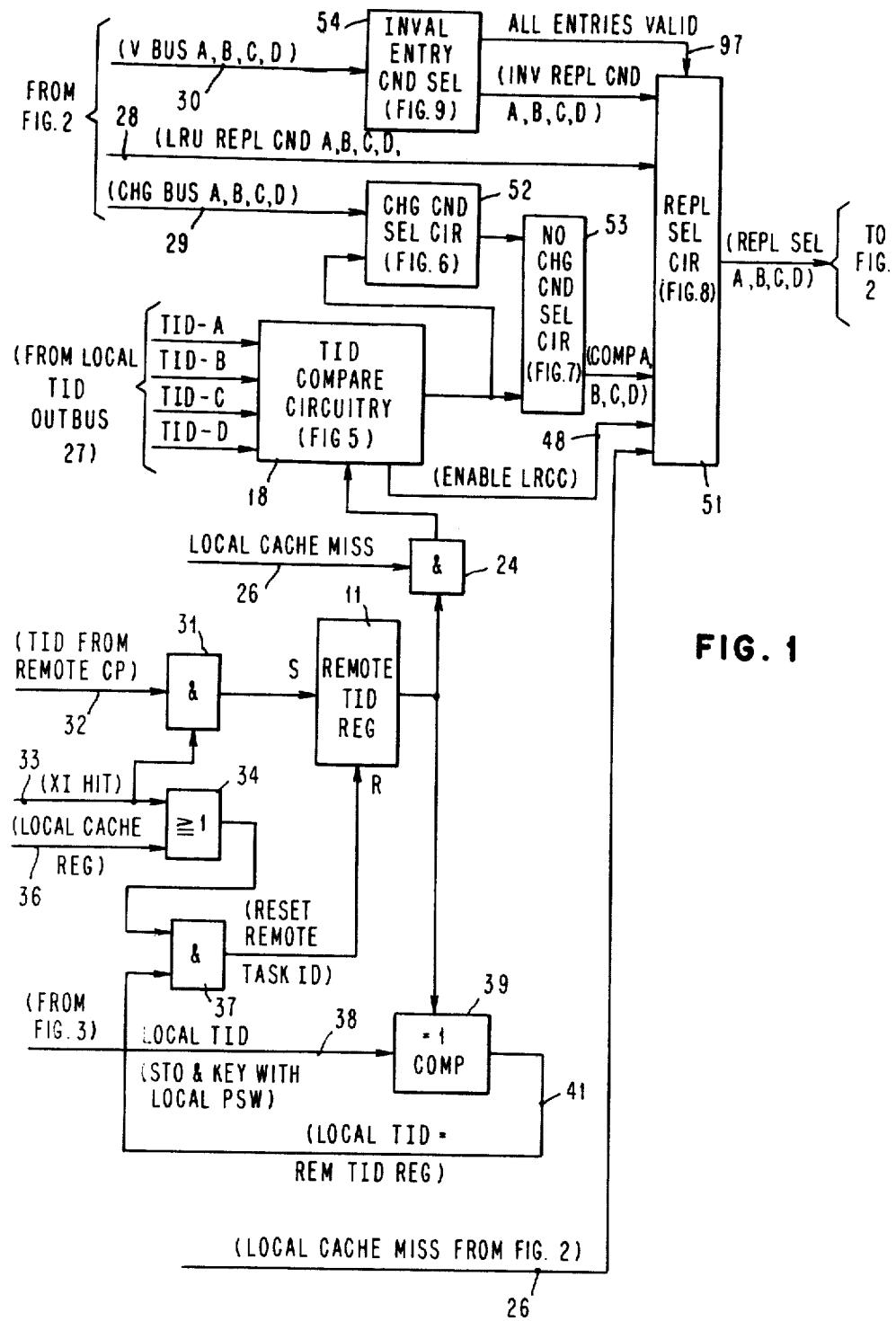
FIG. 1 is a diagram showing an overall embodiment arrangement for task identifier (TID) controlled replacement selection circuits provided with the cache in each CP in an MP.
Figure 2:
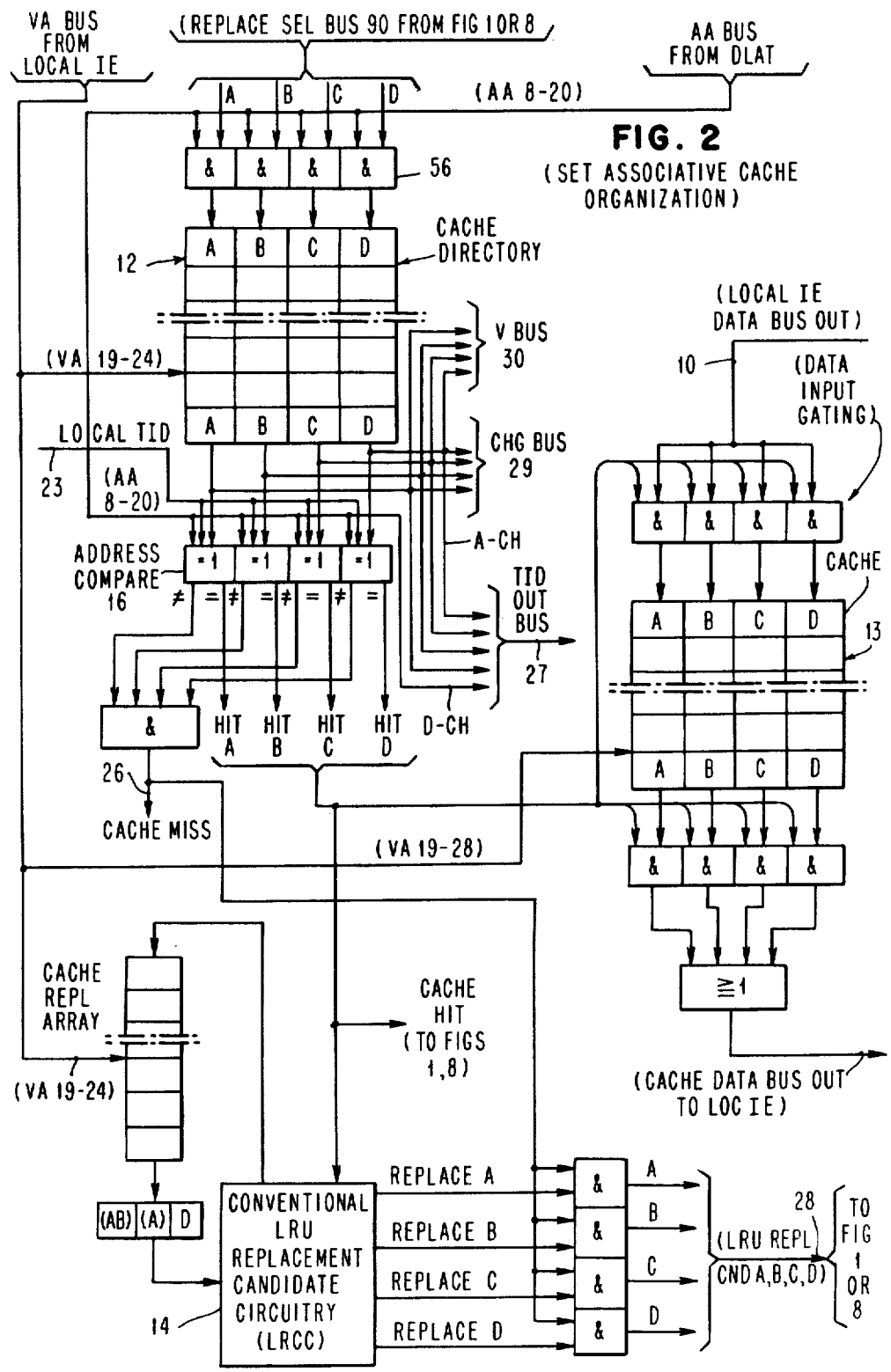
FIG. 2 shows a four way set-associative cache and its directory and replacement controls.
Figure 4:
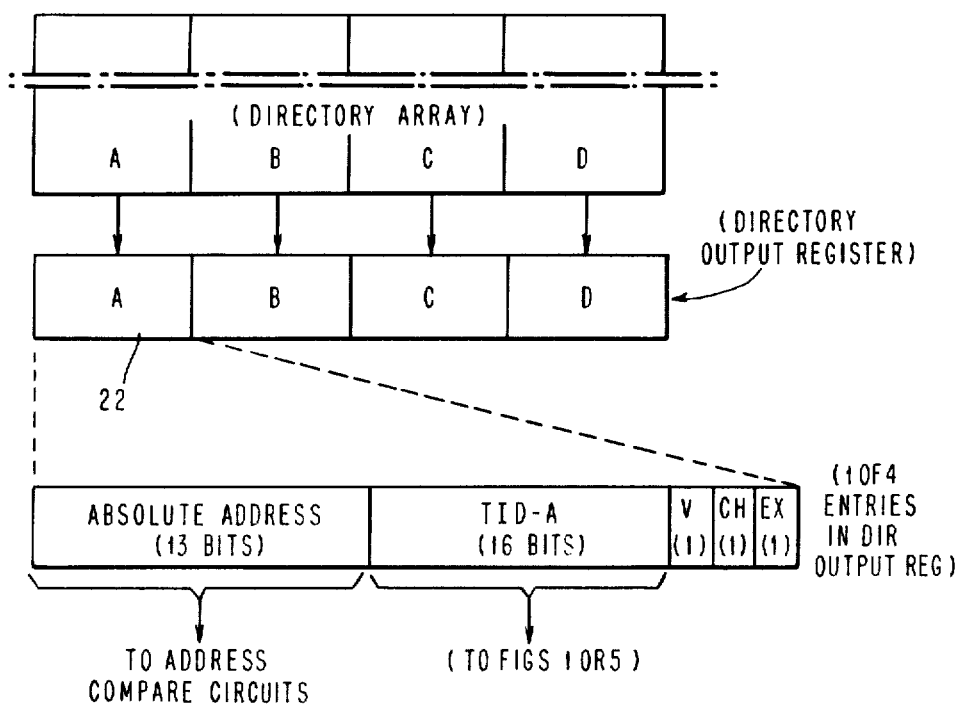
FIG. 4 shows a cache directory output register for receiving a congruence class selected from a four-way set-associative cache directory.

FIG. 1 outlines the preferred embodiment found in each CP for providing cache directory entry replacement selection. FIG. 2 shows the four-way set-associative cache directory 12, its associated CP cache 13, and related controls including conventional LRU replacement candidate circuitry (LRCC) 14 which provides an output on one of four LRU replacement candidate lines A, B, C, D on a bus 28 to replacement selection circuits 51 in FIG. 1. The fields in each entry in cache directory 12 are found in prior cited application Ser. No. 205,500 except for a unique TID field which defines the task which requested the line represented in each valid directory entry. FIG. 4 represents the pertinent content of each directory entry.

Upon each local CP fetch or store request for data at a virtual address (VA), the VA is used to address a congruence class (CC) containing four entries A, B, C and D in cache directory 12 which are read into a directory output register 22 as shown in FIG. 4. The absolute address (AA) in each of the four entries is set-associatively compared in circuits 16 with an AA provided from a conventional DLAT (dynamic lookaside translation buffer) which represents a TLB and contains the translation of the CP requested virtual address (VA). The DLAT is conventional and may be the type disclosed in U.S. Pat. No. 4,136,385 to Gannon et al.

In the selected congruence class in directory output register 22, the four TID's in entries A, B, C, and D are outputted in FIG. 2 on a TID out bus 27 to TID compare circuitry 18 in FIG. 1, which respectively compares the TIDs from the four selected entries A, B, C and D to any remote CP TID in a remote TID register 11 set by a prior cross-interrogation of the local cache directory found in the SC (system controller) connected to the local CP. A compare operation in circuitry 18 occurs on a local cache miss signalled on line 26 to an AND gate 24, which then transfers the remotely provided TID value in register 11 to circuitry 18. If any one or more local TID value A, B, C or D compares equal with the remote TID read out of register 11, then the candidate selection circuits 52 and 53 determine which TID entry is to be the finally selected TID replacement candidate.

Also in the selected congruence class in directory output register 22, the four valid (V) bits A, B, C, D have their states outputted on the four lines in a V bus 30 from FIG. 2 to a replacement selection circuit 51 in FIG. 1. Invalid directory entries (i.e. V=0) are the highest priority candidates for replacement selection by circuit 51 which selects a candidate received from circuit 54. If all selected directory entries are valid, a signal is provided on a line 97 from circuit 54 to circuit 51 to signal that circuit 51 may select a TID candidate, if any is available.

Figure 3:
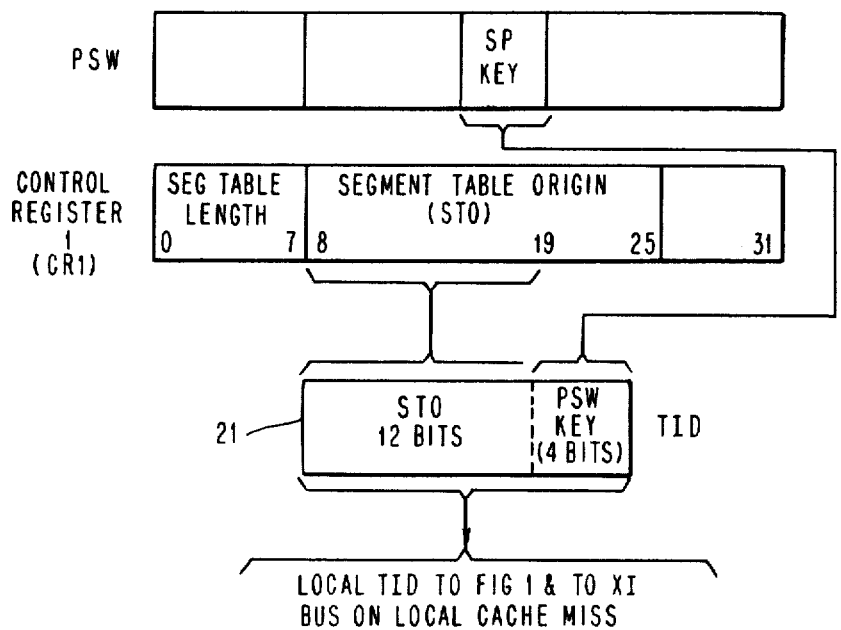
FIG. 3 illustrates the generation of a task identifier (TID) for the preferred embodiment using the current STO and PSW protect key.

FIG. 3 illustrates the content of a conventional control register (CR) 1 and the program status word (PSW)

found in any current large System/370 commercial data processing systems, e.g. the IBM System/370 Model 3033 or 3081. The PSW contains a storage protect (SP) key, and CR1 contains a segment table origin (STO). The PSW key is assigned to the program currently executing on the respective CP. The STO locates the current program's segment table in MS, and thereby identifies the virtual address space for the current program. This embodiment provides concatenation 21 in FIG. 3 of the current STO and PSW key to represent the task identifier (TID) for the currently executing program on each respective CP. The TID local to a respective CP is used for accessing its cache and cross-interrogating the other CPs in the MP on XI bus 9 in FIG. 11. In the commonly used MVS system control program, the STO and key concatenation, in general, identify a task executing on a respective CP.

A reduction in the size of the TID can be obtained by using a STO identifier (ID) instead of the entire STO in the TID, wherein the STO ID is defined and generated as disclosed in U.S. Pat. No. 4,136,385 which substitute a five bit ID for the 30 most recently used STOs in a CP for representing all STOs currently required in the CP DLATs.

Remote TID register 11 in FIG. 1 is set by an output from an AND gate 31 on a cross-interrogate (XI) hit, due to a remote CP request causing a cache miss in a remote CP using the signalled remote TID. Register 11 is reset if a comparator 39 signals that the remote TID in register 11 compares equal with the local TID provided on a line 38 to indicate that the same task is running simultaneously on both the local CP and a remote CP. Accordingly, this embodiment is effective only when the local and remote TIDs are different. The resetting of register 11 by a signal on line 41 from comparator 39 is controlled by an AND gate 37 when it is enabled by either a local cache request on line 36 or by a XI hit (i.e. cache conflict) on line 33 to an OR circuit 34. Whenever register 11 is reset, the four TIDs in the selected congruence class become ineffective in selecting any directory entry replacement candidate, since no output from circuitry 18 can then be activated.

While a remote TID exists in register 11, the four entries in the selected congruence class from the local cache directory have their TIDs examined in determining where their is a TID candidate for replacement. Entries representing invalid lines are always given highest priority for replacement. On each line miss in the local CP, the four TIDs are compared with the remote TID value in register 11 in circuitry 18 (which is shown in detail in FIG. 5).

If no local TID compares equal in circuitry 18, it is indicated by a signal on an enable LRCC line 48 to circuit 51 in FIG. 1 to signal circuit 51 that no TID candidate exists. Then if no invalid or TID entry candidate exists, the replacement selection circuitry 51 in FIG. 1 will select the LRU candidate determined by the conventional LRCC 14 in FIG. 2 to select the directory entry among entries A, B, C or D in the selected congruence class for writing a new line entry in directory 12 for the current CP request.

Figure 5:
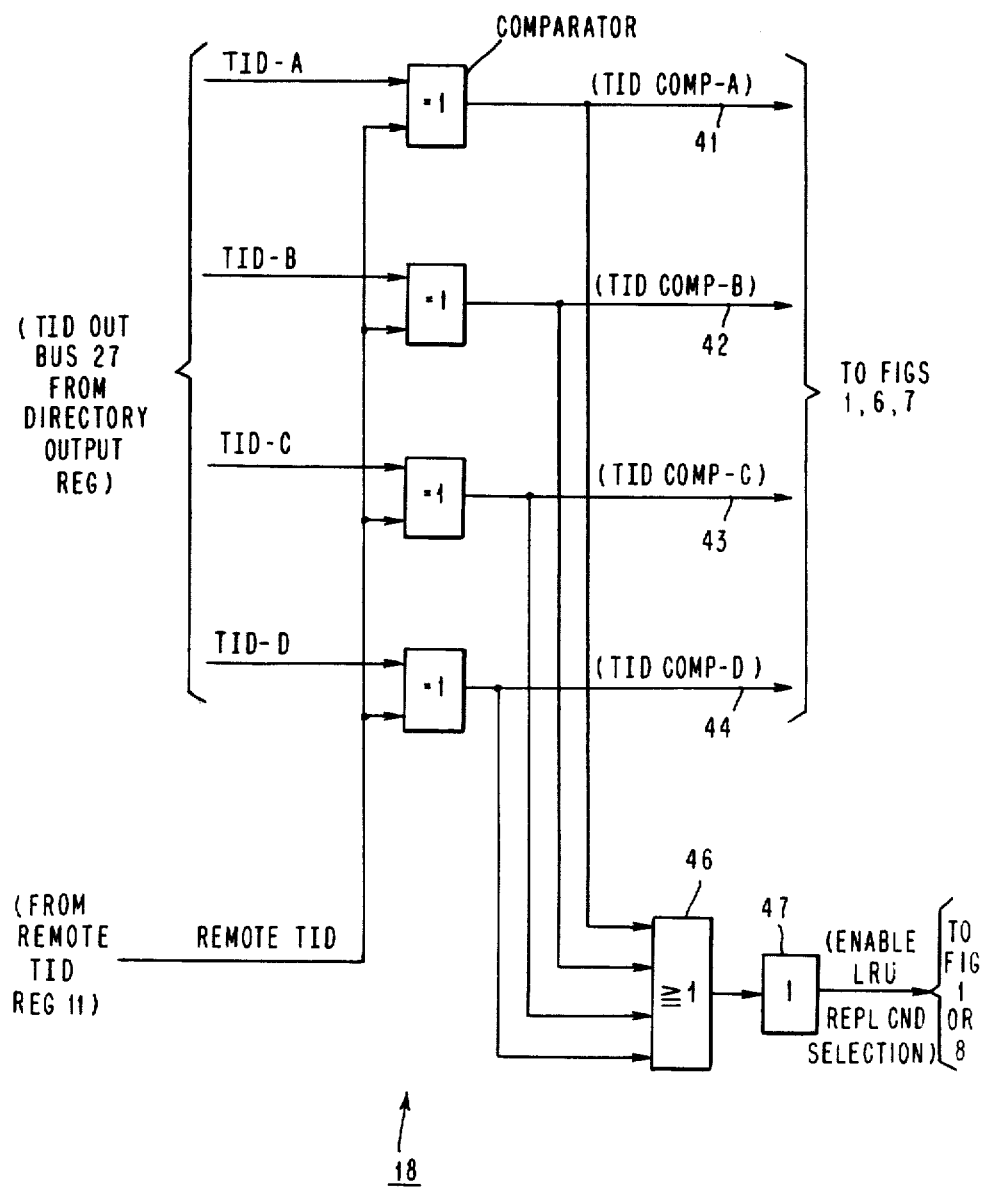
FIGS. 5, 6 and 7 show implementation of TID replacement selection circuitry.

FIG. 5 shows in detail the TID compare circuitry 18 which receives the congruence class selected TID fields from TID bus 27 from FIG. 2. If no TID compare (COMP) line is activated in FIG. 5, an OR circuit 46 and an inverter 48 activate the enable LRU replacement candidate selection line 48 to the replacement selection circuit 51 shown in detail in FIG. 8.

When one or more TID candidates are indicated by TID compare outputs from circuitry 18, TID candidate selection circuits 52 and 53 receive the outputs and determine which one will be the TID candidate. Some TID entries may represent changed lines and other TID entries may represent unchanged lines in the cache. Changed lines has the highest priority for TID replacement because they cause the most overhead on XI hits because of the requirement to castout changed lines before their invalidation, whereas unchanged lines need only be invalidated. Therefore changed TID lines have priority over unchanged TID lines for being selected as the TID candidate.

Figure 6:
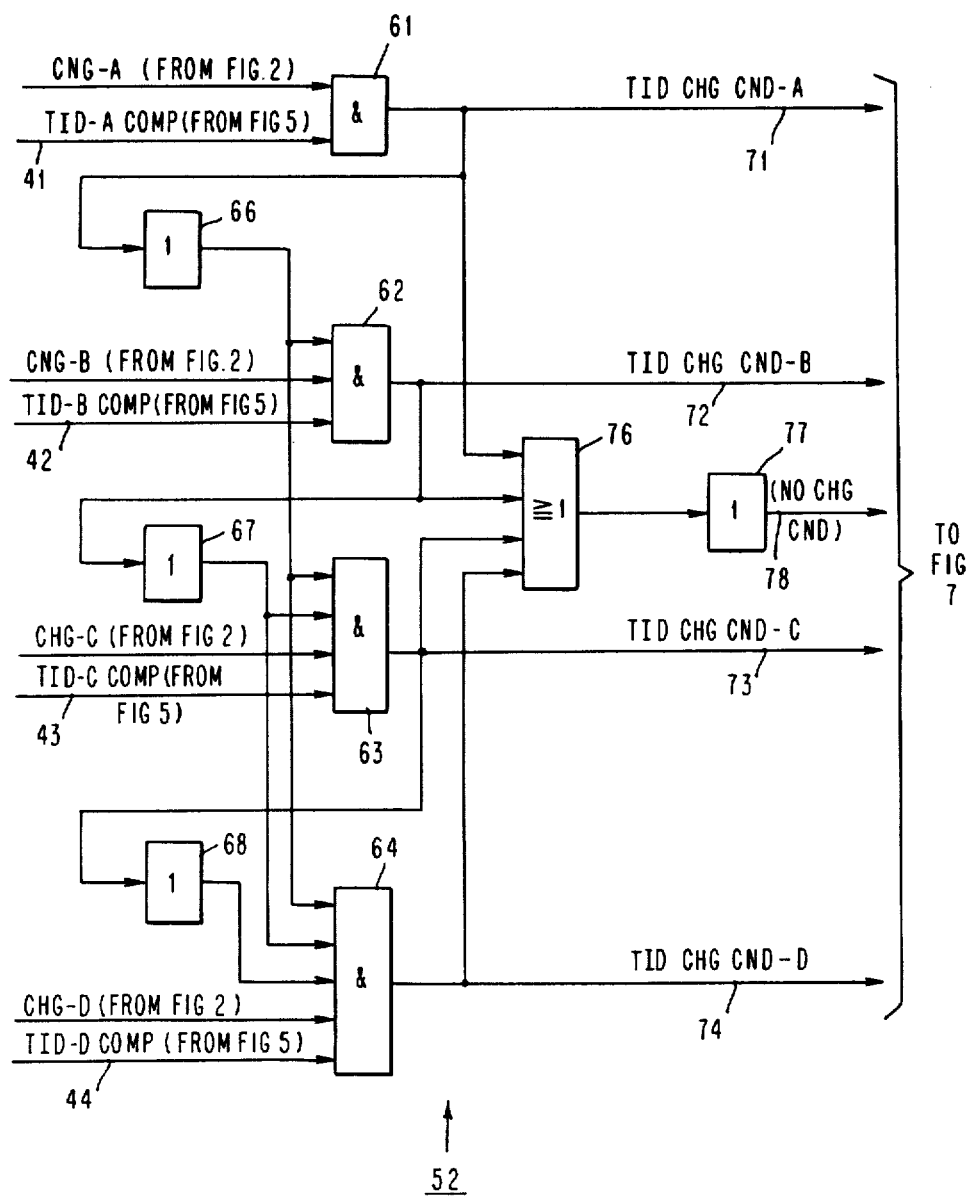

The changed (CNG) line candidate selection circuit 52 is shown in detail in FIG. 6. Circuit 52 also receives the CHG bus 29 from FIG. 2 which indicates the state of the CH bits in the entries A, B, C, D for the selected congruence class. Among plural entries representing changed lines (i.e. CH=1), circuit 52 selects only the entry for the first TID compare output having CH=1 in the order A, B, C and D.

Figure 7:
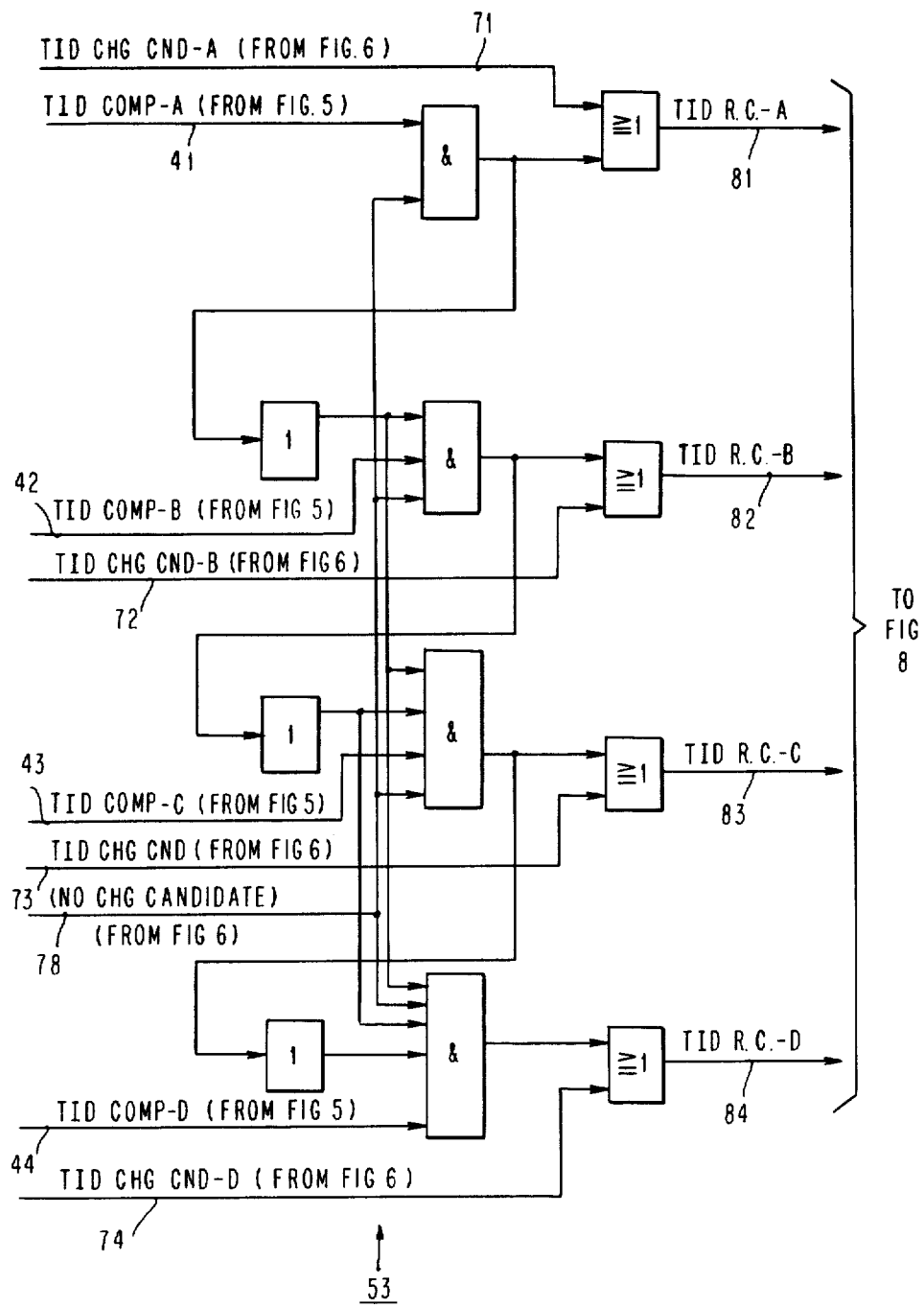

If inverter 77 in FIG. 6 signals on line 78 that there is no TID compare from FIG. 5 having a changed line, then circuit 53 shown in detail in FIG. 7 examines the TID compares signalled by outputs from FIG. 5 that bus 29 indicates have unchanged lines (i.e. CH=0) and chooses one of the latter as the TID replacement candidate (R.C.).

Circuit 51 (shown in detail in FIG. 8) makes the final determination of which candidate of all available candidates will be selected for replacement in cache directory 12. No TID replacement candidate selected by circuit 53 in FIG. 7 will be selected for cache replacement by the circuit in FIG. 8 if any invalid entry exists in the selected congruence class.

Figure 9:
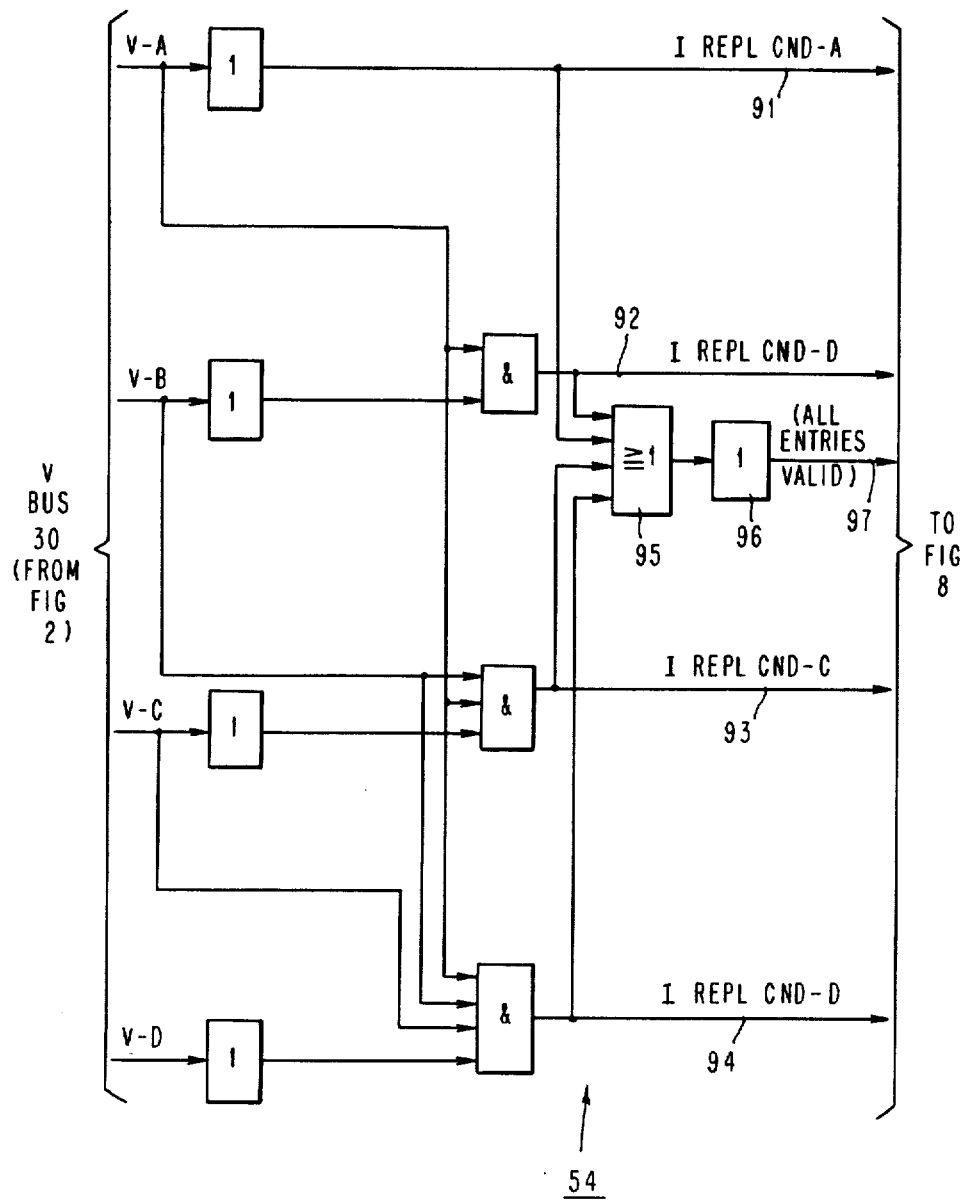
FIG. 9 shows circuitry for invalid cache entry candidate selection.

Circuit 54 shown in detail in FIG. 9 selects among plural invalid entries to determine which will be the invalid entry candidate by selecting the first invalid entry in the order A, B, C, D. A line 97 from FIG. 9 is activated if all entries are valid in the selected congruence class.

Figure 8:
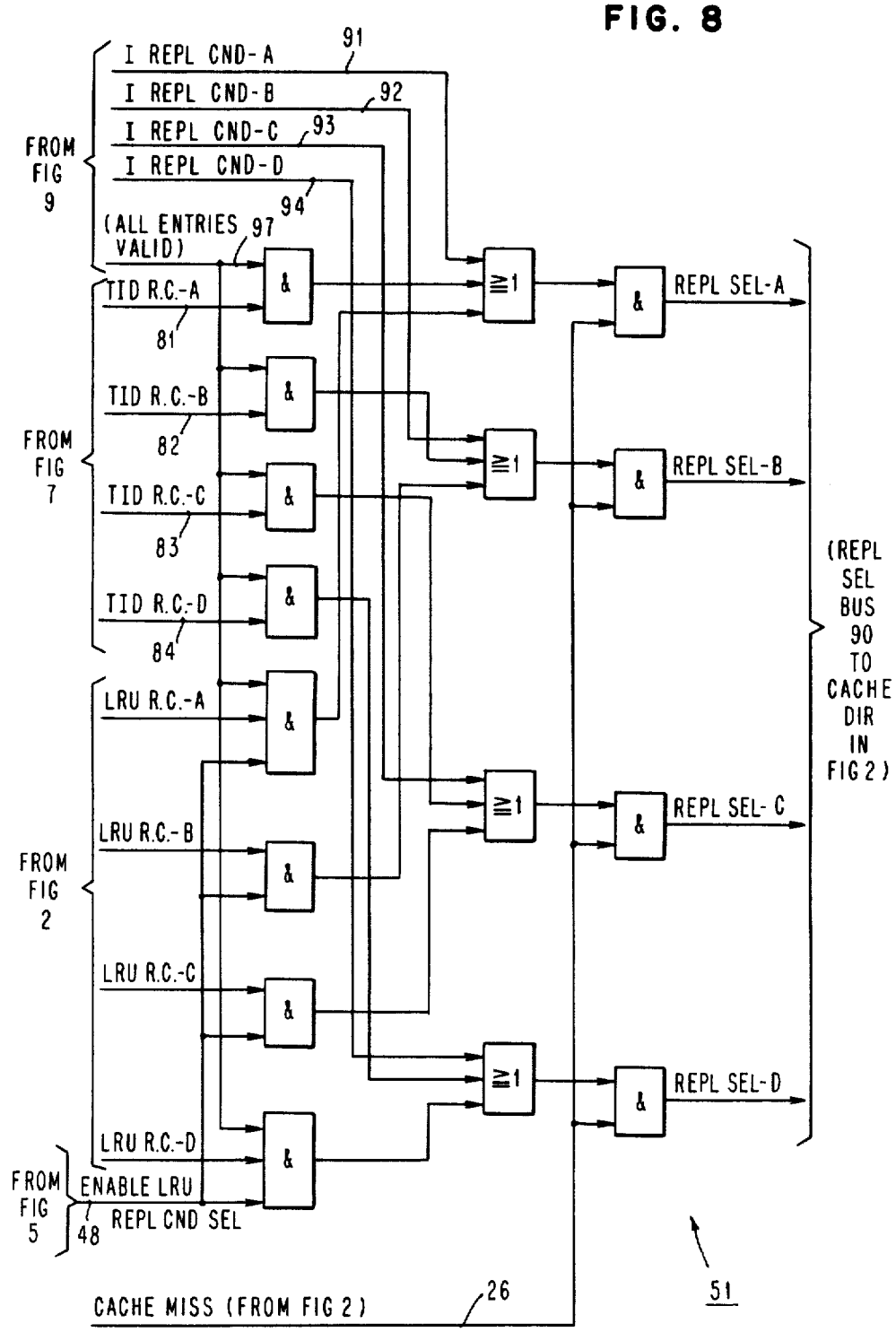
FIG. 8 shows final selection replacement circuitry the TID replacement candidate.

In FIG. 8, line 97 enables the selection of a TID replacement candidate from circuit 53 in FIG. 7 and, if no TID candidate exists, it enables the selection of a LRU replacement candidate from circuit 14 in FIG. 2. If any TID candidate exists, it will be chosen, because any LRU replacement candidate will be blocked by no activation of the enable LRU replacement candidate selection line 48 from FIG. 5 which is not activated when any TID candidate exists.

If no invalid entry candidate exists and no TID candidate exists, then the LRU candidate is selected. Hence, circuits 14, 18, 51, 52, 53 and 54 combine to provide a priority arrangement among the entries in the selected congruence class with an invalid entry having the highest replacement priority, a TID candidate having the next highest replacement priority, and the LRU candidate having the lowest priority. There need not be an invalid candidate or a TID candidate, but there always will be a LRU candidate.

Figure 10:
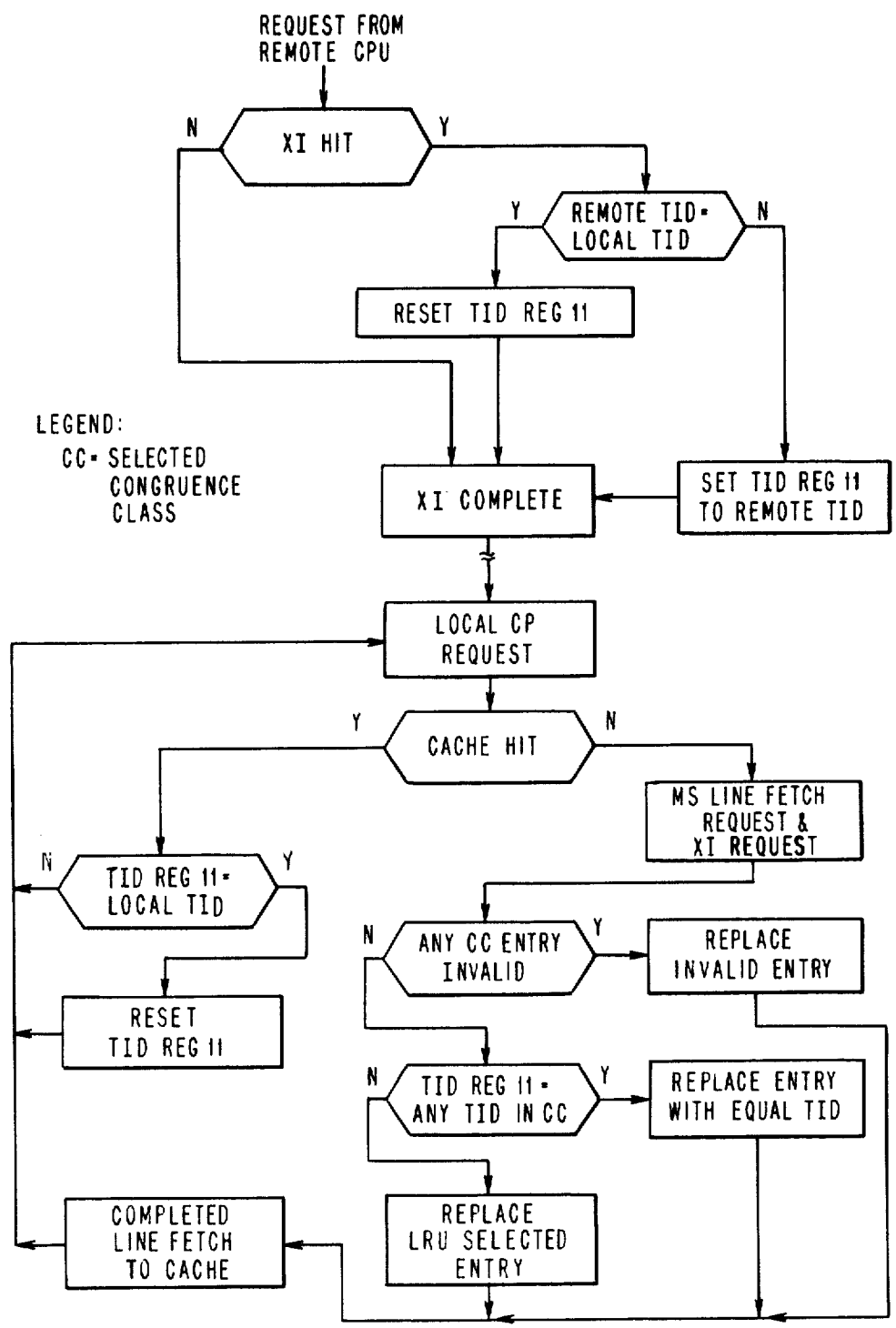
FIG. 10 is a flow chart of the cache replacement method provided by this invention.

FIG. 10 is a detailed flow chart showing the method provided by this invention and describing the operation of the embodiment discussed previously herein in relation to FIGS. 1–9, 11.

While the invention has been particularly shown and described with references to a preferred embodiment thereof, it will be understood by those skilled in the art that the foregoing and other changes in form and details may be made therein without departing from the spirit and scope of the invention.

Having thus described my invention, what I claim as new and desire to secure by Letters Patent is:

1. Cache line entry replacement control for a cache directory in each of plural central processors (CPs) in a multiprocessor (MP), in which each respective CP makes storage requests to a local cache directory, each CP causing a cross-interrogation request to all other CPs in the MP upon a CP request having a cache miss, each respective CP comprising:
   means for generating a task identifier (TID) associated with a program executing in the respective CP,
   means for communicating a task identifier active in the respective CP to the other CPs in the MP,
   cache replacement selection means in the respective CP for enabling the replacement of a cache entry associated with the task identifier of another CP provided by the communicating means.

2. Cache line entry replacement control for an MP as defined in claim 1, further comprising:
   means for inserting the TID of the respective CP into an entry in the local cache directory accessed by a request from the respective CP, each valid entry in the local cache directory having an entry TID.

3. Cache line entry replacement control for a MP as defined in claim 2, further comprising:
   a task identifier (TID) register for containing a TID representing a remote task executing in another CP in the MP,
   means for loading the TID register with a remote TID from another CP when another CP makes a cross-interrogation request to the communicating means.

4. Cache line entry replacement control for an MP as defined in claim 3, further comprising:
   means for detecting a cache miss by a CP request in the local cache directory, a class of entries being accessed in the directory at the time of the cache miss,
   means for entry comparing any remote TID in the TID register with the entry TID in each entry in the class of entries being accessed,
   means for making an accessed local directory entry a TID candidate for replacement when the entry comparing means finds the accessed entry contains a TID equal to a remote TID in the TID register.

5. Cache line entry replacement control for a MP as defined in claim 4, further comprising:
   means for remote comparing a local TID associated with a program executing on the respective CP with any remote TID in the TID register,
   means for resetting the TID register whenever the TID comparing means finds the local TID is equal to the remote TID in the TID register to invalidate any TID content in the TID register.

6. Cache line entry replacement control for an MP as defined in claim 5, further comprising:
   means for enabling the reset means on each cache hit by a CP request to the local cache directory and on each cross-interrogation request by the communicating means.

7. Cache line entry replacement control for an MP as defined in claim 6, further comprising:
   means for detecting any accessed cache directory entry indicating an invalid line in the local cache having a cache miss,
   means for replacing any TID candidate if the detecting means does not detect any entry for an invalid line, but the replacing means first replacing any entry for an invalid line determined by the detecting means.

8. Cache line replacement control for an MP as defined in claim 7, in which the local TID for each CP comprises:
   a segment table origin (STO) in a control register.

9. Cache line replacement control for an MP as defined in claim 7, in which the local TID for each CP comprises:
   a segment table origin (STO) in a control register and a storage protect key in a program status word (PSW) for each CP.

* * * * *